FIRING ORDER AND VALVE OVERLAP

Inventors
Augustus Hasbrouck
Alexander H. King
Lewis Morgan Porter
George L. Williams
by Charles F. Dutton
Attorney

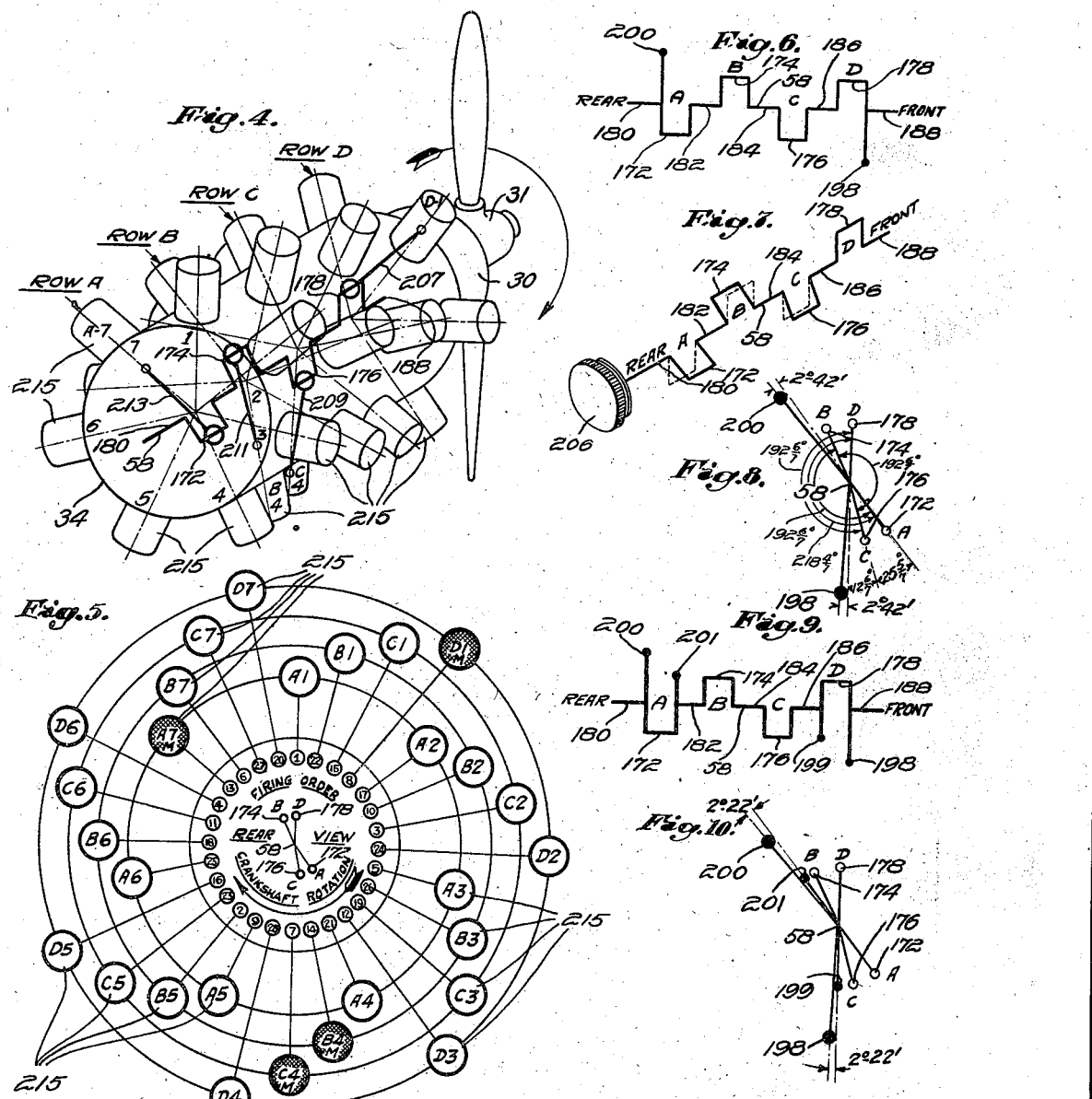

Patented Sept. 2, 1947

2,426,873

UNITED STATES PATENT OFFICE 2,426,873

RADIAL AIRCRAFT ENGINE

Augustus Hasbrouck, Middletown, Alexander H. King, West Hartford, and Lewis Morgan Porter and George L. Williams, Manchester, Conn., assignors to United Aircraft Corporation, East Hartford, Conn., a corporation of Delaware Application September 1, 1944, Serial No. 552,369

4 Claims. (Cl. 123—55)

This invention relates to multi-row radial aircraft engines.

An object of this invention is to improve the operational characteristics of a radial engine having circumferential rows and longitudinal banks of cylinders by providing a novel charging and firing arrangement for the cylinders of such an engine.

A further object of this invention is to improve the charging characteristics of a four row radial aircraft engine having banks of cylinders, by supplying each bank of cylinders with charging fluid through an inline or gallery type manifold and by firing the cylinders of the bank progressively at equal intervals from one to the other end of the cylinder bank.

Other objects and advantages will be apparent from the specification and claims, and from the accompanying drawing which illustrates what is now considered to be a preferred embodiment of the invention.

In the drawings:

Fig. 3 is a chart showing the cylinder firing order and intake valve timing.

Fig. 4 is an isometric schematic view of an engine with which this invention is particularly adapted for use.

Fig. 5 is a diagram showing the spacing of the axes of the cylinders of Fig. 4, and their relation to the spacing of the crankshaft throws.

Figs. 6 and 8 are schematic side and rear views of the crankshaft.

Fig. 7 is a schematic isometric view of the crankshaft.

Figs. 9 and 10 are schematic side and rear views of the crankshaft, showing a modification of the crankshaft counterweighting.

According to this invention, the cylinders of each bank of a four row, seven bank engine of the type disclosed in the Hobbs-Willgoos application Serial No. 552,372, filed concurrently herewith, are fired at equal intervals, progressively from one end to the other end of each bank. In addition, the cylinders of the engine as a whole are fired at equal intervals. It has been found that this firing order, when used in combination with a gallery manifold, or a single induction pipe for each bank fed from one end and connected with short branches to each cylinder of the bank, provides exceptionally good distribution of the charge among the cylinders of each bank as well as among all the cylinders of the engine, as a whole, and enables the intake manifolds to be made of minimum weight and of minimum resistance to the flow of charging air or fuel-air mixture.

Figure 1:
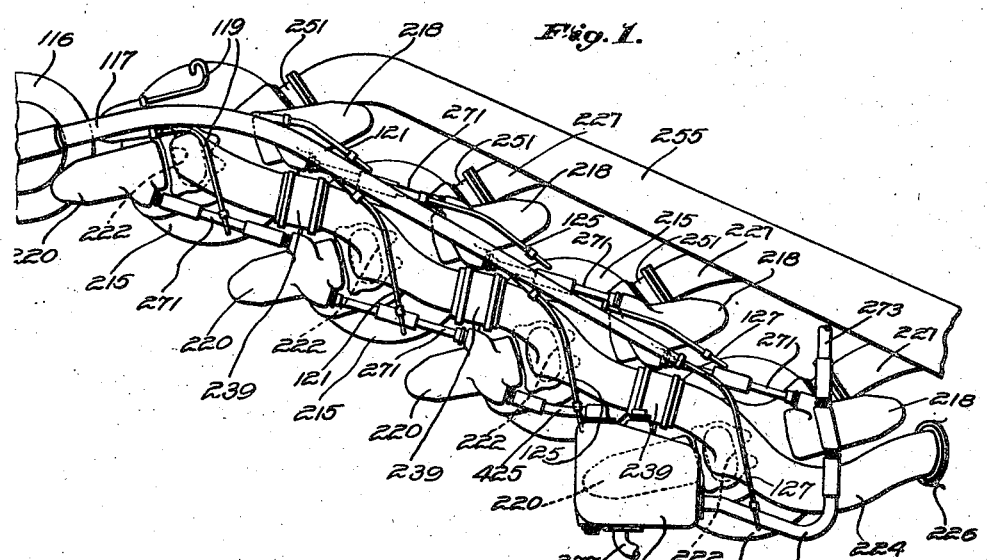
Fig. 1 is a top view of a single bank of cylinders including ignition and charging means therefor.
Figure 2:
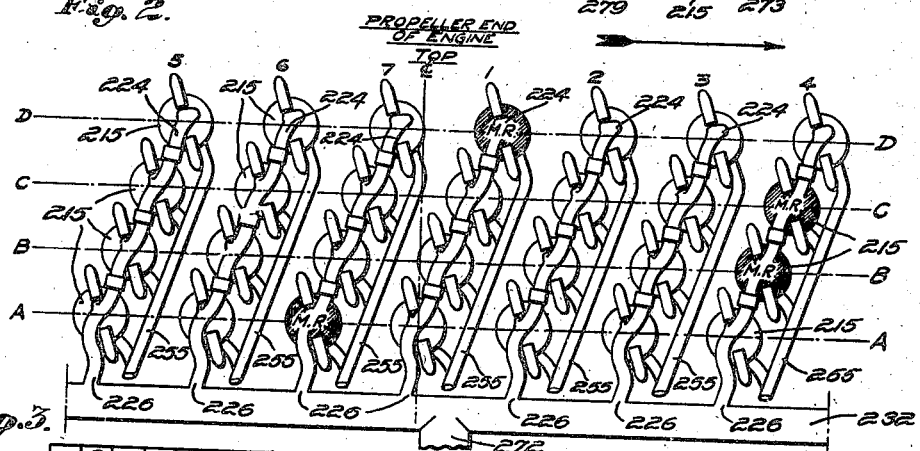
Fig. 2 is a developed view of an engine constructed according to this invention, showing schematically the cylinder, manifold, and supercharger arrangement.

Referring to the drawing, Fig. 1 shows a bank of cylinders constituting one of the cylinder banks marked 1 to 7 in Figs. 2 and 4. The cylinders 215 are mounted on the crankcase 34 in four circumferential rows around the crankcase. Pistons (not shown) in the cylinders 215 are connected by articulated connecting rod systems including master rods 207, 209, 211 and 213 to the crankshaft 58, which in turn is connected to the propeller 31 by a reduction gear drive in the nose 30. The banks 1 to 7 extend spirally or helically on the crankcase and all the cylinders are equally angularly spaced around the crankcase as shown in Figs. 2 and 5.

Each bank of cylinders is provided with a single induction pipe or gallery type manifold 224 (Fig. 1) disposed between the oppositely extending intake rocker boxes 220 and exhaust rocker boxes 218 and extending from the supercharger outlet 226 along the top of the bank to the intake port 222 of the front cylinder of the bank. The intake ports 222 of the remaining three cylinders in the bank are connected to outlets in the side of the manifold 224, and thus all the cylinders of the bank are supplied with charging air or fuel and air from a single pipe having a direct connection with the collector ring of the supercharger. The manifold 224 is preferably made in sections, each having a branch or side outlet for connection to one of the ports 222, and which are joined by flexible connections 239 to form a single pipe.

The supercharger, which is preferably of the centrifugal type, is schematically represented in Fig. 2 and has an annular collector ring 232 provided with equally angularly spaced outlets 226, to which the various intake manifolds 224, are connected. Charging air or fuel-air mixture is admitted to the supercharger by an axial central inlet represented at 272, from which charging fluid is forced radially by an impeller (not shown) to the annular collector ring schematically represented at 232.

Each bank of cylinders is provided with ignition mechanism including a magneto 116 and an ignition manifold 117 from which branch ignition leads 119, 121, 125, 127 extend to the respective cylinders of the banks. Rocker boxes 220 and 218 are provided which enclose poppet type valves actuated by valve mechanism (not shown). Reference is made to the Hobbs-Willgoos application Serial No. 552,372, filed concurrently herewith, for a detailed disclosure of the ignition and valve mechanism, which are not per se a part of this invention.

The engine crankshaft 58 has four crankpins 172, 174, 176, 178 with adjacent crankthrows positioned on opposite sides of the crankshaft axis and with the throws being angularly offset progressively from one to the other end of the crankshaft by an amount equal to the angle of offset of the successive cylinders of any one bank, as shown in Figs. 4 to 10. The crankshaft may be balanced by a pair of counterweights as shown in Figs. 6 and 8, of this pair of counterweights may be split to provide the four counterweight arrangement shown in Figs. 9 and 10.

The ignition mechanism and the valve mechanism are so timed relative to the rotation of the crankshaft as to fire the cylinders in the sequence illustrated in Fig. 3. Cylinder A5 is fired immediately after cylinder D1 and then come cylinders B2, C6, D3, A7, etc. as shown in the chart. The cylinders are fired at equal intervals of time and as the engine is of the four cycle type there will be fourteen equal firing intervals for each revolution of the crankshaft. Fig. 3 therefore represents two crankshaft revolutions.

The cylinders are not only fired at equal intervals for the engine as a whole but are also fired at equal intervals among the cylinders of each bank. Furthermore, the cylinders of each bank are fired progressively down the bank; for instance, bank 1 fires D1, C1, B1, A1, D1. This firing order has been found to provide exceptionally good distribution of the charge among the various cylinders of each bank, particularly when used in combination with a gallery manifold of the type shown. It also provides other advantages, particularly when used with an engine of the type shown for instance, the firing impulses are equall spaced and the crankshaft torque peaks are therefore uniformly spaced, thereby providing an exceptionally smooth running engine. As stated above, the cylinders of each bank are not only fired progressively down the bank but are also fired at equally spaced intervals among the cylinders of the engine as a whole. Referring to Figs. 3 and 5, cylinder C1 fires at seven intervals after cylinder D1, cylinder B1 fires at seven intervals after cylinder C1, cylinder A1 is fired at seven intervals after cylinder B1, and cylinder D1 is again fired at seven intervals after cylinder A1. Consequently, a complete engine bank can cut out or be rendered inoperative with minimum effect upon smoothness of operation of the engine. For instance, if one of the magnetos 116 would fail, so as to cut off the ignition supply to the cylinders of the corresponding cylinder bank, the engine would still continue to run quite smoothly because the cylinders that would stop firing due to such a failure would have their firing intervals equally spaced among the firing intervals of the other cylinders and consequently would have minimum effect on the smoothness of engine operation. This is particularly important in an aircraft engine having separate ignition systems and manifold systems for each cylinder bank. In such an engine, with the firing order shown in Figs. 3 and 5, one or more banks may cut out due to mechanical failure or similar reasons, yet the other banks will continue to function in their normal manner. Thus, each bank functions to a large extent as a separate engine, which considerably increases the dependability of the engine as a whole and materially increases aircraft safety.

The intake valve timing for each bank is particularly important with the firing order described above. It is shown at the bottom of Fig. 3, in which the line 261 represents the point at which the intake valve of cylinder D1 opens, while the lines 263, 265 and 267 represent the times at which the intake valves for cylinders C1, B1 and A1, respectively, open. Line 283 represents the time at which the intake valve of cylinder D1 closes, and lines 285, 287, 281 represent the time at which the intake valves of cylinders C1, B1 and A1, respectively, close. The intake valve of each cylinder opens 20° before top dead center and closes 76° after bottom dead center, consequently there will be an overlap (the intake valves of two cylinders being open simultaneously) between the intake valves in different cylinders of the same bank during an interval of 96°. Each valve will be open during an interval of 276° and the intake valve of one cylinder will open 96° before the intake valve of the cylinder immediately preceding in firing order closes. Charging fluid will, therefore, be passing simultaneously to two cylinders of each bank during the opening and closing periods of valve movement, but during the fully open valve periods only one valve will be open and the charging fluid will be admitted to only one cylinder. For example, when the engine crankshaft is in a position in which the intake valve of the cylinder D1 is fully open charging fluid will be passing only to that cylinder. As the intake valve of cylinder D1 begins to close the valve of cylinder C1 will open and charging fluid will be admitted to both cylinders D1 and C1 until the valve of cylinder D1 is closed. As the valve of cylinder C1 begins to close the valve of cylinder B1 opens and charging fluid will be admitted to both cylinders C1 and B1 until the valve of cylinder C1 is closed. This process is repeated among all the cylinders of the bank in the manner shown at the bottom of Fig. 3. The airflow from the blower outlet 226 to the various cylinders of the bank is always in one direction and by the shortest path and it has been found that with the firing order and valve overlap shown in Fig. 3 and with the manifold arrangement shown in Fig. 1 that the cylinders of each bank will be uniformly charged to provide equal distribution of power output and uniformity of operation among the cylinders of each bank. Furthermore with the combination shown in Fig. 2 by which each intake manifold is similarly connected to the supercharger collector 232, at equal angular spacings, the charge distribution among the various banks is also uniform and provides uniform power output and operation among the cylinders of the engine as a whole.

Reference is made to our applications Serial No. 552,368 and Serial No. 552,370, filed concurrently herewith, which claim subject matter disclosed and not claimed in this application.

The word "longitudinal" is used in a broad sense in this application to include cylinder banks extending generally lengthwise.

It is to be understood that the invention is not limited to the specific embodiment herein illustrated and described. For instance, it may be used in engines having five or nine longitudinal banks, or more than four circumferential rows, or in other ways without departure from its spirit as defined by the following claims.

We claim:

1. In a radial aircraft engine having a crankshaft, a plurality of cylinders spaced equally around said crankshaft and arranged in four circumferential rows and seven spiral banks with four cylinders in each bank, an intake opening in the top of each of said cylinders, an induction pipe extending along the top of each cylinder bank and having four outlets respectively connected with the intake openings of the cylinders in the bank, said induction pipes each having a single inlet at one end thereof, and means for firing the cylinders in each of said banks at equal intervals during two revolutions of said crank shaft successively from the end of the bank farther-most from its induction pipe inlet to the end of the bank closest to said induction pipe inlet.

2. The combination of claim 1, including an intake valve for controlling the flow of fluid through each of said intake openings, with the valves in successively firing cylinders having overlapping open periods.

3. In a radial aircraft engine, a plurality of cylinders arranged in four circumferential rows and in longitudinal banks, and means for firing said cylinders at equal intervals for the engine as a whole and at equal intervals for each bank, with the cylinders of each bank being fired progressively from one to the other end of said bank, successively firing cylinders of the engine as a whole being located about one hundred and eighty degrees apart.

4. In a radial aircraft engine having cylinders arranged in circumferential rows and in longitudinal banks, a separate gallery type manifold for each bank comprising a single induction pipe extending along the bank and having a plurality of outlets respectively connected with intake openings in the cylinders of the bank, each induction pipe having a single inlet at one end thereof, means for firing the cylinders of the engine as a whole at equal intervals and for firing the cylinders in each bank at equal intervals consecutively from one to the other end of said bank, and an intake valve in each cylinder for controlling the flow of fluid through the respective intake opening, with the valves of successively firing cylinders in each bank having overlapping open periods.

AUGUSTUS HASBROUCK.
ALEXANDER H. KING.
LEWIS MORGAN PORTER.
GEORGE L. WILLIAMS.

REFERENCES CITED

The following references are of record in the file of this patent:

UNITED STATES PATENTS

| Number | Name | Date |
|---|---|---|
| 1,283,970 | Thomas | Nov. 5, 1918 |
| 2,366,852 | Goodman | Jan. 9, 1945 |
| 1,367,194 | Lefranc | Feb. 1, 1921 |
| 1,241,199 | Crompton | Sept. 25, 1917 |
| 2,120,045 | Towns | June 7, 1938 |